United States Patent [19]

Oka

[11] Patent Number: 5,461,115
[45] Date of Patent: Oct. 24, 1995

[54] CONTINUOUS PRODUCTION PROCESS OF A PROPYLENE-ETHYLENE BLOCK COPOLYMER

[75] Inventor: Takahiro Oka, Ichiharashi, Japan

[73] Assignee: Chisso Corporation, Osaka, Japan

[21] Appl. No.: 309,834

[22] Filed: Sep. 21, 1994

[30] Foreign Application Priority Data

Nov. 10, 1993 [JP] Japan ..................... 5-304844

[51] Int. Cl.$^6$ .................................. C08F 297/08
[52] U.S. Cl. .......................... 525/247; 525/258; 525/323; 525/53
[58] Field of Search ................... 525/323, 247, 525/258, 53

[56] References Cited

U.S. PATENT DOCUMENTS

| | | | |
|---|---|---|---|
| 4,739,015 | 4/1988 | Toyota et al. | 525/247 |
| 4,760,113 | 7/1988 | Chiba et al. | 525/323 |
| 4,771,103 | 9/1988 | Chiba et al. | 525/247 |
| 4,808,667 | 2/1989 | Goko et al. | 525/247 |
| 5,055,528 | 10/1991 | Kioka et al. | 525/323 |
| 5,140,062 | 8/1992 | Chiba et al. | 525/247 |

FOREIGN PATENT DOCUMENTS

| | | |
|---|---|---|
| 55-115417 | 9/1980 | Japan . |
| 57-147508 | 9/1982 | Japan . |
| 57-145115 | 9/1982 | Japan . |
| 57-174311 | 10/1982 | Japan . |
| 58-32615 | 2/1983 | Japan . |
| 62-116618 | 5/1987 | Japan . |

*Primary Examiner*—Carman J. Seccuro, Jr.
*Attorney, Agent, or Firm*—Lowe, Price, LeBlanc & Becker

[57] ABSTRACT

A continuous process for producing a propylene-ethylene block copolymer having well-balanced properties of impact strength, stiffness, processability, etc. using a highly active catalyst, with a superior productivity is provided, which process comprises a first polymerization step (I), carried out using a catalyst system consisting of [A] a solid catalyst component containing Ti, Mg, halogen and a polyvalent carboxylic acid ester as indispensable components, [B] an organoaluminum compound catalyst component and [C] an electron-donating compound, using two or more continuous polymerization vessels, and feeding monomer(s) of ethylene/(ethylene+propylene) of 0 to 5% by weight, to carry out polymerization composed mainly of propylene, so as to give 60 to 95% of the total polymerized quantity;

a continuous addition of a glycol compound (D) expressed by the formula $$R^1-(OC_mH_{2m})_n-OR^2$$

wherein m is an integer of 2 or more, n is an integer of 3 or more, $R^1$ and $R^2$ each are H atom, an alkyl group or a monovalent organic group containing a hetero atom of O, N, P, S, Si, etc., and may be same or different; so as to give a value of [D]/Ti in [A]=1 to 100 mols/atom; and successively, a polymerization step (II) carried out using one or more continuous polymerization vessels, and feeding monomers of ethylene/(ethylene+propylene) of 10 to 100% by weight, to carry out a propylene-ethylene random copolymerization composed of ethylene in a relatively large quantity, so as to give 5 to 40% by weight of the total polymerized quantity.

3 Claims, 2 Drawing Sheets

CONTINUOUS PRODUCTION PROCESS OF A PROPYLENE-ETHYLENE BLOCK COPOLYMER

BACKGROUND OF THE INVENTION

1. Field of the Invention

This invention relates to a continuous production process of a propylene-ethylene block copolymer, using a highly active catalyst, and further it relates to a process for producing a copolymer having very well-balanced qualities of impact strength, stiffness, processability, etc. with a good productivity.

2. Description of the Related Art

Crystalline polypropylene produced using a stereospecific catalyst has superior properties such as stiffness, heat resistance, etc., but on the other hand, it has a problem that its impact strength, particularly, low temperature impact strength, is low; hence its use application range has been practically restricted. Thus, in order to solve the problem, a number of copolymers of propylene with ethylene or other olefins have been proposed. In the case of propylene-ethylene block copolymerization process, the low temperature impact strength can be improved to a large extent without damaging the stiffness, heat-resistance, etc. which are superior characteristics of polypropylene, but, on the other hand, a problem has been raised in the aspect of production and quality specific of the propylene-ethylene copolymerization process. Namely, in the case of the production of this propylene-ethylene block copolymer by way of batch polymerization process, the yield of the polymer per unit time and per unit polymerization vessel is lower than that in the case of continuous polymerization process and hence the cost becomes higher. On the other hand, in the case of a multistage, continuous polymerization process, the retention times of the respective catalyst particles in the respective stage polymerization vessels, respectively, form a distribution (which is considered to be close to the distribution in a completely mixing vessel); hence the resulting aggregates of polymer particles have distibutions in the content ratio of the polypropylene portion (PP portion: a portion containing propylene in a large quantity i.e. a portion prepared in the polymerization step (I)) and the content ratio of the propylene-ethylene random copolymer portion (RC portion: a portion containing ethylene in a large quantity i.e. a portion prepared in the polymerization step (II)); hence a problem occurs in the aspect of production and quality, originated from the non-uniformity of the distributions. Thus, a number of proposals for overcoming such a drawback of the continuous polymerization process have been made.

For example, Japanese patent application laid-open Nos. Sho 58-49716, Sho 55-116716, Sho 58-69215, etc. have proposed a process of classifying the slurry having left the above-mentioned polymerization step (I) by means of a cyclone and again returning fine particles to the polymerization step (I), but since such a classification by way of catalyst particle size does not always accord with the distribution of retention time, improvement in the non-uniformity is insufficient.

Japanese patent application laid-open Nos. Sho 57-195718, Sho 58-29811, etc. have disclosed a process of intermittently carrying out the feed of catalyst into the polymerization vessel and removal of slurry therefrom to thereby reduce the quantity of the catalyst entering the polymerization step (II) during a short retention time, but this has raised a problem that the polymerization reaction is unstable.

Further, there have been proposed some processes as in the process of the present invention, wherein the slurry having left the polymerization step (I) is treated with an electron-donating compound or the like to thereby selectively inactivate the catalyst having left the stage within a short retention time (short-cut-pass catalyst). For example, according to the use of electron-donating compounds proposed in Japanese patent application laid-open Nos. Sho 58-32615, Sho 57-174311, Sho 57-147508, Sho 57-145115, Sho 55-115417, etc., the effectiveness has been insufficient for achieving the continuous production process of propylene-ethylene block copolymer having physical properties corresponding to those according to batch type polymerization process. Further, according to a process proposed in Japanese patent application laid-open No. Sho 62-116618, a polymer having physical properties corresponding to those obtained according to batch type polymerization process has been obtained, but since a large reduction in the activity during the polymerization step (II) occurs, there has been raised a problem that the quantity polymerized at the polymerization step (II) cannot be raised.

In the present invention, the present inventors have this time found a compound having such an effectiveness far larger than that of so far known compounds, that the short cut pass catalyst having passed through the above polymerization step (I) while keeping a far shorter retention time of catalyst than the average retention time is selectively inactivated by the compound to thereby suppress the polymerization reaction at the above polymerization step (II), and prevent formation of polymer particles having a higher ratio of RC portion at this polymerization stage. As a result, by mixing the above found compound with the polymer formed at the polymerization step (I), the above problems of the prior art could have been solved.

As apparent from the foregoing, the object of the present invention is to provide a continuous production process of ethylene-propylene copolymer having solved the problems of the prior art by employing a specified polymerization process and a specified compound, to thereby obtain a superior copolymer having well-balanced properties of impact resistance, stiffness, processing characteristics, etc. with a good yield.

SUMMARY OF THE INVENTION

The present invention has the following constitutions (1) to (3):

(1) In a continuous production process of a propylene-ethylene block copolymer by way of multistage polymerization steps, using a catalyst system having combined a solid catalyst component (A) containing titanium, magnesium, halogen and a polyvalent carboxylic acid ester as indispensable components, an organoaluminum compound (B) and an electron-donating compound (C), and employing three or more connected polymerization vessels, the improvement which comprises a first stage wherein two or more polymerization vessels connected in series are employed and a polymerization step (I) directed mainly to propylene polymerization is continuously carried out while feeding monomer(s) of ethylene/(ethylene+propylene) in a ratio of 0 to 5% by weight, to prepare a polymer of 60 to 95% by weight of the total polymer weight, and a second stage wherein a glycol compound (D) expressed by the formula (1)

$R^1$—$(O$—$CH_2$—$C(R^7)H$—$)_n$—$OR^2$ (1)

(wherein n represents $3 \leq n \leq 100$, $R^1$ and $R^2$ each represent hydrogen atom, or a monovalent organic group of 1 to 20 carbon atoms or a monovalent organic group of 1 to 20 carbon atoms containing a hetero atom of oxygen, nitrogen, phosphorus, sulfur or silicon atom, $R^1$ and $R^2$ may be same or different and $R^7$ represents hydrogen atom or a monovalent organic group of 1 to 5 carbon atoms), is continuously added to a polymerization reaction mixture obtained at the first stage, so as to give a D mol/Ti atom in (A) of 1 to 100, followed by successively feeding to the addition polymerization reaction mixture, monomers of ethylene/(ethylene+propylene) in a ratio of 10 to 100% by weight, employing one or more polymerization vessels, to continuously carry out a polymerization step (II) wherein a relatively large quantity of ethylene is contained and a copolymer of 5 to 40% by weight of the total polymer weight is produced.

(2) A process according to item (1), wherein the melt index (abbreviated to MI (i)) of the polymer obtained at the polymerization step (I) wherein propylene is mainly contained, and the melt index (abbreviated to MI (ii)) of the copolymer obtained at the polymerization step (II) wherein ethylene is contained in a relatively large quantity, have the following relationship:

$2 \leq LOG\ (MI(i)/MI(ii)) \leq 7$ wherein the melt indexes refer to a value measured at 230° C. and under a load of 2.16 Kg according to ASTM D-1238.

(3) A process according to item (1), wherein the quantity of said glycol compound added is determined so that the catalytic activity after its addition can be 80 to 98% of the catalytic activity before its addition.

DETAILED DESCRIPTION OF PREFERRED EMBODIMENTS

In the present invention, there is used a highly stereoregular catalyst system obtained by using as a polymerization catalyst, a solid catalyst component (A) containing at least magnesium atom, titanium atom, a halogen atom and a polyvalent carboxylic acid ester, an organoaluminum compound (B) and an electron-donating compound (C), but such a catalyst system has no particular limitation, but it is possible to use various known catalyst systems affording highly stereoregular polypropylenes.

Such a solid catalyst component (A) can be prepared for example according to the processes disclosed in the following Japanese patent application laid-open Nos. Sho 50-108385, Sho 50-126590, Sho 51-20297, Sho 51-28189, Sho 51-64586, Sho 51-92885, Sho 51-136625, Sho 52-87489, Sho 52-100596, Sho 52-147688, Sho 52-04593, Sho 53-2580, Sho 53-40093, Sho 53-40094, Sho 55-35102, Sho 55-135103, Sho 55-152710, Sho 56-811, Sho 56-11908, Sho 56-18606, Sho 58-83006, Sho 58-138705, Sho 58-138706, Sho 58-138707, Sho 58-138708, Sho 58-38709, Sho 58-138710, Sho 58-138715, Sho 60-23404, Sho 61-21109, Sho 61-37802, Sho 61-37803, Sho 62-104810, Sho 62-104811, Sho 62-104812, Sho 62-104813, Sho 63-54405, etc.

Concrete examples of the polyvalent carboxylic acid esters used in the above solid component (A) are esters of phthalic acid, maleic acid, substituted malonic acids, etc. with an alcohol having two or more carbon atoms.

Magnesium compounds used for the above (A) in the present invention are various, and those having either reducing capability or none are used.

Examples of the former are dimethylmagnesium, diethylmagnesium, dipropylmagnesium, dibutylmagnesium, ethylmagnesium chloride, propylmagnesium chloride, butylmagnesium chloride, etc.

Further, examples of the latter are magnesium halides such as magnesium chloride, magnesium bromide, magnesium iodide, etc., alkoxymagnesium chloride such as methoxymagnesium chloride, ethoxymagnesium chloride, etc., alkoxymagnesiums such as ethoxymagnesium, isopropoxymagnesium, butoxymagnesium, etc., magnesium carboxylates such as magnesium laurate, magnesium stearate, etc.

Particularly preferred compounds among these are magnesium halides, alkoxymagnesium chlorides and alkoxymagnesiums.

As the titanium compound used in the solid catalyst component (A) in the present invention, compounds expressed by Ti(OR)$_A$X$_4$-$_A$ (wherein R represents a hydrocarbon group, X represents halogen and $0 \leq A \leq 4$) are usually optimum.

Concrete examples are titanium tetrahalides such as TiCl$_4$, TiBr$_4$, etc., alkoxytitanium trihalides such as Ti(OCH$_3$)Cl$_3$, Ti (OC$_2$H$_5$)Cl$_3$, etc. dialkoxytitanium dihalides such as Ti(OCH$_3$)$_2$Cl$_2$, Ti(OC$_2$H$_5$)$_2$Cl$_2$, etc., trialkoxytitanium monohalides such as Ti(OCH$_3$)$_3$Cl, Ti(OC$_2$H$_5$)$_3$Cl, etc. tetraalkoxytitaniums such as Ti(OCH$_3$)$_4$, Ti(OC$_2$H$_5$)$_4$, etc. TiCl$_4$ is particularly preferred.

In the preparation of the solid catalyst component (A), besides the above titanium compound, magnesium compound and polyvalent carboxylic acid ester, another electron donor such as alcohols, ethers, phenols, silicon compounds, aluminum compounds, etc. may be made coexistent therewith.

As the organoaluminum compound (B) used in the present invention, organoaluminum compounds expressed by the formula AlR$^2_p$R$^3_q$X$_{3-(p+q)}$ (wherein R$^2$ represents a hydrocarbon group, R$^3$ represents an alkoxy group, X represents a halogen atom, p and q each represent an optional number of $0 \leq p \leq 3$, $0 \leq q \leq 3$ and $1.5 \leq p+q \leq 3$) can be used. Concrete examples are trimethylaluminum, triethylaluminum, tri-n-propylaluminum, tri-n-butylaluminum, tri-i-butylaluminum, diethylaluminum chloride, di-n-propylaluminum monochloride, diethylaluminum iodide, methylaluminum sesquichloride, ethylaluminum sesquichloride, ethoxydiethylaluminum, etc.

These organoaluminum compounds (B) can be used alone or in admixture of two or more kinds.

As the electron donor component (C) used in the present invention, organosilicon compounds expressed by the formula R$^4_x$R$^5_y$Si (OR$^6$)$_z$ (wherein R$^4$ and R$^6$ each represent a hydrocarbon group, R$^5$ represents a hydrocarbon group or a hydrocarbon group containing a hetero atom, x+y+z=4, $0 \leq x \leq 2$, $0 \leq y \leq 3$ and $1 \leq z \leq 3$) can be used. Concrete examples are methyltrimethoxysilane, methyltriethoxysilane, methyltripropoxysilane, ethyltrimethoxysilane, ethyltriethoxysilane, ethyltripropoxysilane, n-propyltrimethoxysilane, n-propyltriethoxysilane, i-propyltrimethoxysilane, i-propyltriethoxysilane, n-butyltrimethoxysilane, n-butyltriethoxysilane, i-butyltrimethoxysilane, i-butyltriethoxysilane, t-butyltrimethoxysilane, t-butyltriethoxysilane, n-pentyltrimethoxysilane, n-pentyltriethoxysilane, neopentyltrimethoxysilane, neopentyltriethoxysilane, hexadecyltrimethoxysilane, hexadecyltriethoxysilane, dimethyldimethoxysilane, dimethyldiethoxysilane, diethyldimethoxysilane, diethyldiethoxysilane, di-n-propyldimethoxysilane, di-i-propyldimethoxysilane, di-n-butyldimethoxysilane, di-i-butyldimethoxysilane, di-t-butyldimethoxysilane, di-n-pentyldimethoxysilane, dineopentyldimethoxysilane, phenyltrimethoxysilane, phenyltriethoxysilane, diphenyldimethoxysilane, diphenyldiethoxysilane, cyclohexyltrimethoxysilane, cyclohexyltriethoxysilane, dicyclohexyldimethoxysilane, dicyclohexyldiethoxysilane, 3-mercaptopropylmethyldimethoxysilane, 3-isocyanatopropyltriethoxysilane, 2-(3-cyclohexenyl)ethyltrimethoxysilane, etc.

These organosilicon compounds can be used alone or in admixture with two or more kinds in an optional ratio.

Figure 1:
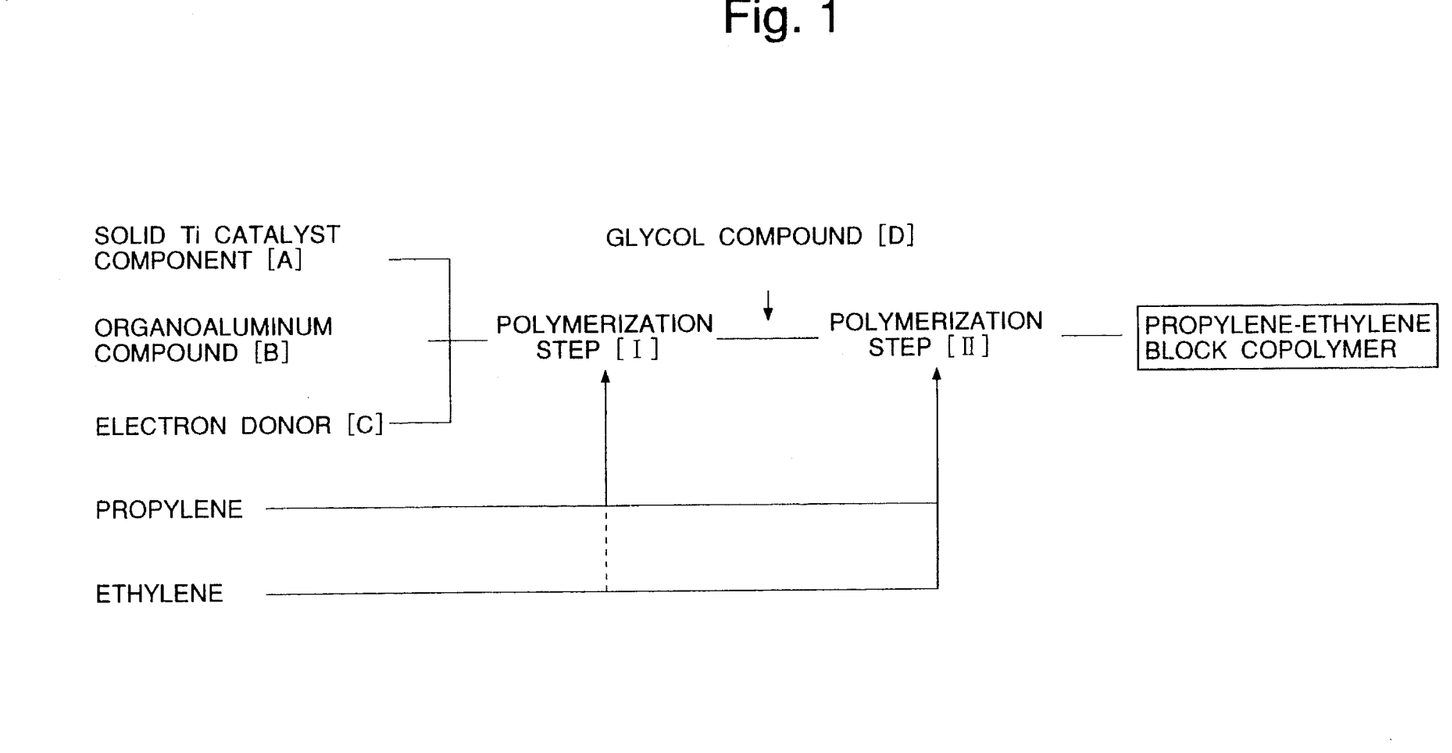
FIG. 1 shows a chart illustrating the flows of the catalyst and the monomers in the present invention.

In the present invention, crystalline homopolymer or copolymer of propylene is prepared using the abovementioned catalyst system, at the polymerization step of the former stage i.e. the polymerization step (I), followed by mixing a glycol compound (D) with the resulting material and thereafter carrying out homopolymerization of ethylene or a random copolymerization of propylene with ethylene in the presence of the above polymer or copolymer at the polymerization step of the latter stage, i.e. the polymerization step (II). The flows of these catalysts and the monomers are shown in FIG. 1.

The glycol compound (D) inevitably used in the process of the present invention is a compound expressed by the formula (1)

$$R^1-(OCH_2-C(R^7)H-)_n-OR^2 \quad (1)$$

wherein n represents $3 \leq n \leq 100$, $R^1$ and $R^2$ represent hydrogen atom, a monovalent organic group of 1 to 20 carbon atoms or a monovalent organic group of 1 to 20 carbon atoms containing a hetero atom such as oxygen, nitrogen, phosphorus, sulfur, silicon atom, etc., and $R^1$ and $R^2$ may be same or different and $R^7$ represents hydrogen atom or an organic group of 1 to 5 carbon atoms.

Its concrete examples are as follows: triethylene glycol, tetraethylene glycol, hexaethylene glycol, heptaethylene glycol, polyethylene glycol, triethylene glycol monoalkyl ether, tetraethylene glycol monoalkyl ether, hexaethylene glycol monoalkyl ether, heptaethylene glycol monoalkyl ether, polyethylene glycol monoalkyl ether, triethylene glycol dialkyl ether, tetraethylene glycol dialkyl ether, hexaethylene glycol dialkyl ether, heptaethylene glycol dialkyl ether, polyethylene glycol dialkyl ether, triethylene glycol monoalkyl ester, tetraethylene glycol monoalkyl ester, hexaethylene glycol monoalkyl ester, heptaethylene glycol monoalkyl ester, polyethylene glycol monoalkyl ester, triethylene glycol dialkyl ester, tetraethylene glycol dialkyl ester, hexaethylene glycol dialkyl ester, heptaethylene glycol dialkyl ester, polyethylene glycol dialkyl ester, tripropylene glycol monoalkyl ether, tetrapropylene glycol monoalkyl ether, hexapropylene glycol monoalkyl ether, heptapropylene glycol monoalkyl ether, polypropylene glycol monoalkyl ether, etc. and further, tetraethylene glycol monoacrylate, hexaethylene glycol monoacrylate, heptaethylene glycol monoacrylate, polyethylene glycol monoacrylate, triethylene glycol diacrylate, tetraethylene glycol diacrylate, hexaethylene glycol diacrylate, heptaethylene glycol diacrylate, polyethylene glycol diacrylate, triethylene glycol monomethacrylate, tetraethylene glycol monomethacrylate, hexaethylene glycol monomethacrylate, heptaethylene glycol monomethacrylate, polyethylene glycol monomethacrylate, triethylene glycol dimethacrylate, tetraethylene glycol dimethacrylate, hexaethylane glycol dimethacrylate, heptaethylene glycol dimethacrylate, polyethylene glycol dimethacrylate, etc.

The quantity of these glycol compounds (D) used is varied depending upon their kinds, and the compounds are used in a proportion of (D)/Ti in (A) of 1 to 100 mols/atom ((A) :solid catalyst component). Namely, when the catalytic activity in the case where the glycol compound (D) is not added, is regarded as 100%, it is preferred to add (D) so as to afford a catalytic activity within a range of 80 to 98%.

If the added quantity is too large, the activity reduction in the polymerization step (II) is so large that such quantity is economically undesirable. Whereas, if the added quantity is too small, the effect of the selective inactivation of the above-described short pass catalyst is insufficient.

The glycol compound (D) used in the present invention is notably effective as compared with so far known ketones, amines, amides, alkyl ethers, carboxylic acid esters, halogenated compounds, etc. The reason is considered to be as follows:

The number of oxygen atom of (D) coordinated with the catalyst is so large that this constitutes a suitably viscous complex with the organoaluminum compound (B), so that the diffusion of the organoaluminum compound into the inside of the polymer particles is inhibited; hence since the polymer particles containing the short cut pass catalyst is relatively small, it is possible to preferentially inactivate the short cut pass catalyst. Namely, it is presumed to be a necessary condition that (B) (organoaluminum compound) forms a complex having an adequate viscosity with (D) (glycol compound) and is provided with a property of being adequately difficult to be impregnated into the inside of the polymer particles.

The polymerization of the present invention is also carried out according to slurry polymerization using an inert solvent or a gas phase polymerization carried out in a gas phase propylene. In the instant polymerization, a polymerization directed mainly to polypropylene is carried out at the first polymerization step (I). As the inert solvent for the slurry polymerization, usually used solvents such as propane, butane, hexane, kerosine, etc. can be used, and propylne itself can be also used. The slurry polymerization is carried out at a polymerization temperature of usually 20° to 90° C., preferably 50° to 80° C., under a polymerization pressure of 0 to 50 Kg/cm²G and for an average retention time of 30 minutes to 15 hours. The gas phase polymerization is carried out usually at a polymerization temperature of 20° to 150° C., under a polymerization pressure of 2 to 50 Kg/cm²G and for an average retention time of 30 minutes to 10 hours. Hydrogen is usually used for controlling the molecular weight, and the polymerization is carried out so as to give an MI of 0.2 to 400.

As to the composition of monomers fed at the polymerization step (I), an ethylene/(ethylene+propylene)=0 to 5% by weight is employed. If the ethylene proportion is larger than 5% by weight, a drawback occurs that physical properties characteristic of polypropylene such as stiffness, heat resistance, etc. lower.

Further, as a third component of monomers, it is possible to feed 1-butene, 4-methylpentene-1, styrene, a non-conjugated diene, etc. in a quantity of 0 to 10% by weight based upon propylene.

The proportion of polymer obtained at the polymerization step (I) is 60 to 95% by weight based upon the total weight of the finally obtained propylene-ethylene block copolymer. If the polymerized quantity is smaller than the above range, the stiffness of product lowers, while if it exceeds the range, improvement in the low-temperature impact strength is insufficient. The polymerization step (I) is carried out using two or more polymerization vessels connected in series. If only one polymerization vessel is used, although an improvement effect to a certain extent is observed, the quality of product is still yet inferior to that according to batch polymerization process; hence the object of the present invention is insufficient to be achieved.

The polymerization slurry i.e. the polymerization reaction mixture after completion of the polymerization step (I) is continuously withdrawn and a glycol compound (D) is added and mixed, followed by sending the above mixture to the polymerization step (II). Addition of the glycol compound is carried out continuously.

As to the site where the glycol compound (D) is added, it is possible to provide a tank (for example, a separation tank for propylene monomer) between the polymerization step (I) and the polymerization step (II), where the compound is added to and mixed with polymerization reaction particles, or it is also possible to add and mix the compound directly to the polymerization step (II). As to the quantity of the glycol compound (D) added, a range of (D)/Ti in the solid catalyst of 1 to 100 (mol/atom) is preferred. If the value is less than 1, uneven particles referred to as fish eyes (hereinafter abbreviated to FE) notably increase, and further a low-temperature impact strength lowers. On the other hand, if the value exceeds 100, the polymerization activity lowers. It is particularly preferred to control the quantity of the glycol compound added so as to afford a polymerization activity after its addition of 80 to 98% based upon the activity in the case of no addition. The polymerization step (II) is carried out usually at a polymerization temperature of 20° to 80° C., preferably 40° to 70° C., under a pressure of 0 to 50 Kg/cm²G and for an average retention time of 20 minutes to 10 hours. The step is carried out usually using hydrogen for controlling the molecular weight and at its concentration in gas phase of 1 to 40 mol %.

The mixing ratio of ethylene to propylene fed at the polymerization step (II) is an ethylene/(ethylene+propylene) of 10 to 100% by weight, preferably 20 to 70% by weight, and the polymerized quantity is 5 to 40% by weight based upon the final propylene-ethylene block copolymer. Further, besides ethylene and propylene, another α-olefin, non-conjugated diene, etc. may be simultaneously used. The relationship between the MI(i) of the polymer obtained at the polymerization step (I) and the MI(ii) of the polymer obtained at the polymerization step (II) is particularly preferred to be $$2 \leq Log(MI(i)/MI(ii)) \leq 7 \quad (2)$$

Herein, MI refers to a value obtained by measurement at 230° C. and under a load of 2.16 Kg according to the method of ASTM D-1238. MI (i) refers to an observed value directed to only the polymer at the polymerization step (I), and MI(ii) refers to a value calculated from an observed value after completion of the second step (referred to as MI (i+ii)), a polymer fraction ($W^1$) at the polymerization step (I) and a polymer fraction ($W^2$) at the polymerization step (II), according to the following equations (3) and (4):

$$Log\ MI\ (i+ii) = W^1 Log\ MI(i) + W^2 Log\ MI(ii) \quad (3)$$

$$W^1 + W^2 = 1 \quad (4)$$

In the case of Log (MI(i)/(MI(ii))<2, the resulting polymer has a tendency that the low-temperature impact strength, the tensile strength, the weld strength, etc. lower. Further, there is a tendency that the quantity of the by-product which is a polymer soluble in the polymerization solvent increases.

In the case of Log (MI(i)/MI(ii))>7, the resulting polymer has a tendency that FE increases.

In addition, analyses and measurement methods of the physical properties directed to the following Examples are shown below.

MI:ASTM D-1238 (g/10 min.), 230° C., 2.16 Kg load.

Ethylene content: according to infrared absorption spector method (% by weight)

Ratio of polymerized quantities ($W^1/W^2$) of polymerization step (I) and polymerization step (II): Copolymers having varied the ratio of reaction quantity of ethylene/propylene were prepared in advance, and making them standard samples, a calibration curve was prepared by means of infrared absorption spectra, followed by seeking the ratio of reaction quantity of ethylene/propylene at the second polymerization step (II) and calculating the captioned ratio ($W^1/W^2$) from the ethylene content in the total polymer (weight/weight).

Catalytic activity at the polymerization step (II): The polymerization activity at the time of no addition of the glycol compound was regarded as 100% and the captioned ratio was sought based upon the above activity.

FE (Fish eye): according to Chisso method (number of fish eye/1000 cm²)

Flexural modulus: according to JIS K6758 (Kgf/cm²)

Izod impact strength (II): according to JIS K6758 (Kg f cm/cm)

As described above, according to the present invention, an effectiveness far exceeding the prior art has been obtained by employing specified polymerization conditions and a specified additive. The present invention will be described in more detail by way of Examples, but it should not be construed to be limited thereto.

EXAMPLE 1

(Catalyst preparation-preparation of solid titanium catalyst component)

A mixture of magnesium ethoxide (150 g), 2-ethylhexylalcohol (275 ml) and toluene (300 ml) was agitated at 93° C. for 3 hours in the presence of $CO_2$ atmosphere of 2 Kgf/cm²G, followed by further adding toluene (400 ml) and n-decane (400 ml), the resulting solution being hereinafter referred to as magnesium carbonate solution.

Toluene (100 ml), chlorobenzene (30 ml), tetraethoxysilane (9 ml), $TiCl_4$ (8.5 ml) and Isopar G (an isoparaffin having an average carbon number of 10, b.p.: 156–176° C.) were agitated at 30° C. for 5 minutes, followed by adding the above magnesium carbonate solution (50 ml), agitating the mixture for 5 minutes, adding tetrahydrofran (22 ml), agitating the mixture at 60° C. for one hour, stopping the agitation, removing the supernatant, washing the resulting solids with toluene, adding chlorobenzene (100 ml) and $TiCl_4$ (100 ml) to the solids, agitating the mixture at 135° C. for one hour, stopping the agitation, removing the supernatant, adding chlorobenzene (250 ml), $TiCl_4$ (100 ml) and di-n-butyl phthalate (2.1 ml), agitating the mixture at 135° C. for 1.5 hour, removing the supernatant, washing the solids successively with toluene (600 ml), Isopar G (800 ml) and hexane (400 ml), to obtain a solid catalyst component. The composition of this solid catalyst component was as follows: Ti: 2.3% by weight, Cl: 55% by weight, Mg: 17% by weight, di-n-butylphthalate: 7.5% by weight.

(Preparation of preactivated catalyst)

A 50 l capacity stainless reactor provided with slant blades was purged with nitrogen gas, followed by feeding n-hexane (40 l), adding the above solid product (75 g) and triethylaluminum (80 g) at room temperature, reacting propylene (150 g) for 120 minutes and removing unreacted propylene, to obtain a preactivated catalyst.

(Polymerization process)

Figure 2:
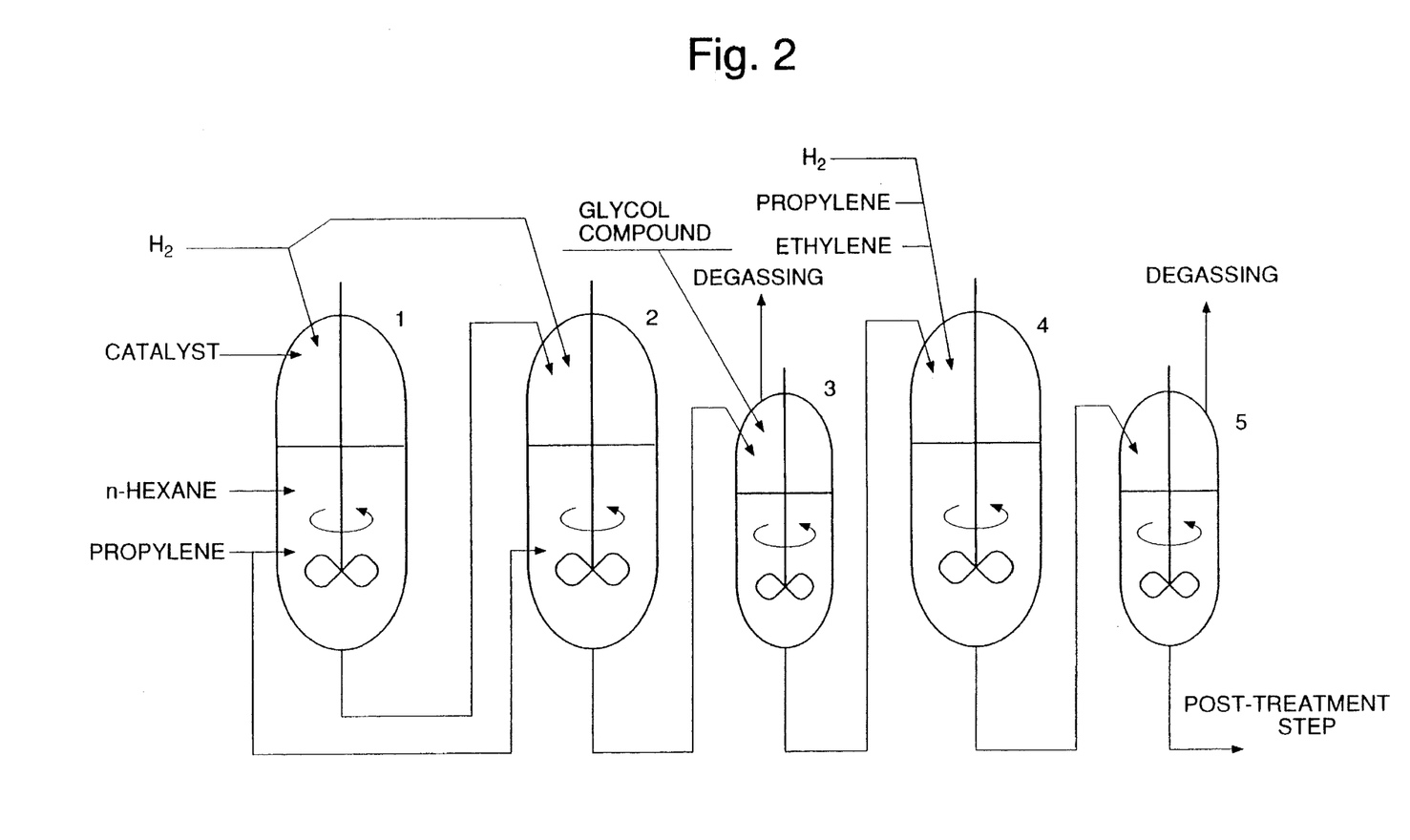
FIG. 2 shows a reaction apparatus employed in Examples and Comparative examples.

Polymerization was carried out as illustrated in FIG. 2.

Polymerization step (I)

Into a 400 l capacity reactor 1 were continuously fed propylene (14 l/hr.), n-hexane (26 l/hr.), the preactivated catalyst slurry (400 ml/hr.) prepared according to the above process, and di-i-propyldimethoxysilane (1.7 g/hr.), at 70° C. in a reactor vessel of 7 Kg/cm$^2$G, the slight control of the pressure being carried out by varying the quantity of propylene fed.

Further, hydrogen gas was fed so as to give the same hydrogen concentration at gas phase part in both the reactors 1 and 2 and so as to give values described in Table 1—1, while observing the process gas chromatography analysis. The slurry having left the reactor 2 was fed into a pressure drop vessel 3.

The pressure drop vessel was adjusted to 70° C. and 0.5 Kg/cm$^2$G and tetraethylene glycol dimethyl ether was added in a proportion of 10.0 mols/Ti atom in solid catalyst into the vessel. The slurry withdrawn from the pressure drop vessel 3 was fed into a polymerization vessel 4.

Polymerization step (II)

Propylene (2.0 Kg/hr.) and ethylene (1.0 Kg/hr.) were fed into the polymerization vessel 4 while maintaining it at 60° C. As a result, the gas composition at the gas phase part in the polymerization vessel 4 (ethylene/(ethylene+propylene)) was 35 gaschro %.

Further, as to the hydrogen concentration in the gas phase, hydrogen was fed so as to maintain the value indicated in Table 1—1. The slurry having left the polymerization vessel 4 was dropped in the pressure in a pressure drop vessel 5 and was deactivated with methanol, followed by neutralizing with aqueous NaOH, washing with water, powder-separating, drying and recovering a product powder (about 8 Kg/hr). Midway, the above slurry was sampled at pressure-drop vessels 3 and 5, and analized together with the product powder.

(Production of injection-molded product)

A phenolic heat stabilizer (0.003 Kg) and calcium stearate (0.003 Kg) were mixed with the product powder obtained above (3.0 Kg) by means of a high-speed stirring type mixer (Henschel mixer (tradename)), at room temperature for 10 minutes, followed by granulating the resulting mixture by means of an extrusion type granulator having a screw diameter of 40 mm, subjecting the resulting granules to an injection-molding machine at a molten resin temperature of 230° C. and at a mold temperature of 50° C., to prepare JIS type testpieces, keeping the testpieces for 72 hours in a room kept at a humidity of 50% and at room temperature (23° C.) and measuring their values of physical properties mentioned below. The values are shown in Table 1—1.

(Measurement of fish eyes (FE))

The granules were made into a film of 0.03 mm thick by means of a 40 mm T die (lip width: 30 cm) manufactured by Yamaguchi Seisakusho Co., Ltd., followed by measuring the number of extraneous matters having a diameter of 0.1 mm or more by means of an FE counter manufactured by Yasukawa Denki Co., Ltd. Measurement was carried out with an area of 30,000 cm$^2$ and the FE number was calculated into that per 1,000 cm$^2$. The results are shown in Table 1—1.

Comparative Example 1

Example 1 was repeated except that tetraethylene glycol dimethyl ether was not added into the pressure-drop vessel 3. The results are shown in Table 1—1.

Examples 2 and 3

Example 1 was repeated except that the quantity of tetraethylene glycol dimethyl ether added was varied. The results are shown in Table 1—1.

Comparative Examples 2 and 3

Example 1 was repeated except that the quantity of tetraethylene glycol dimethyl ether added in the pressure-drop vessel 3 was varied.

In the case where tetraethylene glycol dimethyl ether was not added or in the case where its quantity added was less than that of the present invention, the FE-preventive effect was small, a luster unevenness in the product appearance occurred to lose the commodity value, and also the Izod impact strength and flexural modulus were inferior. Further, in Comparative Example 2, the catalytic activity in the polymerization lowered and polymerization hardly proceeded. The results are shown in Table 1—1.

Examples 4–7

Example 1 was repeated except that the gas phase hydrogen concentration at the polymerization step (II) was varied.

In the case where the proportion of MI was made larger than the value within the range of the equation (2), there is a tendency that fish eyes increase. To the contrary, in the case where the proportion was made smaller, there are tendencies that the soluble polymer component increases and the Izod impact strength lowers. The results are shown in Table 1—1.

Comparative Example 4

Example 1 was repeated except that ethyl benzoate was used as an electron donor in the preparation of the solid Ti catalyst component.

Comparative Example 5

Example 1 was repeated except that the catalyst preparation, the preparation of preactivated catalyst and the polymerization step (I) were carried out according to the Example disclosed in Japanese patent application laid-open No. Sho 62-116618.

In the cases of Comparative Examples 4 and 5, activity reduction in the polymerization step (II) was large and the ratio of the polymerized quantities became smaller. Further, the ethylene content became lower than that in Example 1. The results are shown in Table 1-2.

Comparative Examples 6–11 and Examples 8–13

Example 1 was repeated except that the kind and quantity of glycol compounds were varied as shown in Table 1-3 and Table 1-4.

Example 14

Example 1 was repeated except that the preparation of the solid catalyst component was carried out as follows:

Into a SUS autoclave purged with nitrogen gas were fed anhydrous MgCl$_2$ (95.3 g) and dry EtOH (352 ml), followed by heating and dissolving the mixture at 105° C. with stirring for one hour, thereafter feeding the resulting solution into a two-fluid spray nozzle with pressurized nitrogen gas (10 Kg/cm²G) heated to 105° C. Nitrogen gas was flown in a quantity of 38 l/min. Liquid nitrogen for cooling was fed into a spray column and the temperature inside the column was kept at −15° C. The product was collected in hexane for cooling fed into the bottom part of the column, to obtain a carrier (256 g). This carrier was subjected to aeration drying at room temperature, for 181 hours, using nitrogen gas in a flow quantity of 3 l/min. In a glass flask, the dried carrier (20 g), TiCl$_4$(160 ml) and purified 1,2-dichloroethane (240 ml) were mixed, followed by heating the mixture at 100° C. with stirring, adding diisobutyl phthalate (6.8 ml), heating the mixture at 100° C. for 2 hours, removing the liquid phase portion by decantation, again adding TiCl$_4$ (160 ml) and purified 1,2-dichloroethane (320 ml), heating the mixture at 100° C. for one hour, removing the liquid phase portion by decantation, washing the residue with purified hexane and drying to obtain a Ti-containing solid catalyst. The results are shown in Table 1–5.

Comparative Example 12

Example 12 was repeated except that diethylene glycol dimethyl ether was added in place of tetraethylene dimethyl ether in the pressure-drop vessel 3. The results are shown in Table 1–5.

Example 15

Example 1 was repeated except that the polymerization process was carried out as follows:

Polymerization step (I):

Into a 400 l capacity polymerization vessel 1 were continuously fed propylene (14 l/hour), a preactivated catalyst slurry (160 ml/hour) and di-i-propyldimethoxysilane (1.7 g/hr.), to carry out polymerization at 70° C. and under a pressure of the polymerization vessel of 33 Kg/cm²G. The gas phase hydrogen concentration was made equal in both the polymerization vessels 1 and 2. The slurry having left the polymerization vessel 2 was fed into the polymerization vessel 4 after having bypassed the pressure-drop vessel 3. At that time, tetraethylene glycol dimethyl ether was added in a quantity of 10 mols/Ti mol in solid catalyst, via a bypass line.

Polymerization step (II):

This step was carried out in the same manner as in Example 1 except that hexane (50 l/hour) was fed into the pressure-drop vessel 5. The results are shown in Table 1–5.

Comparative Example 13

Example 8 was repeated except that diethylene glycol dimethyl ether was added in place of tetraethylene glycol dimethyl ether into the pressure-drop vessel 3. The results are shown in Table 1–5.

Effectiveness of the Invention

According to the present invention, by carrying out a propylene-ethylene block copolymerization in a combination of a specified catalyst system with specified polymerization conditions, it has become possible to provide a copolymer having well-balanced qualities of impact strength, stiffness, processability, etc. according to continuous polymerization process and with superior productivity; hence the present invention has a great commercial meaning.

TABLE 1-1

| | Results of polymerization conditions | | | | | | | | | |
|---|---|---|---|---|---|---|---|---|---|---|
| | Example 1 | Comp.ex. 1 | Example 2 | Example 3 | Example 4 | Example 5 | Comp.ex. 2 | Comp.ex. 3 | Example 6 | Example 7 |
| Solid catalyst component (A) | Present invention | → | → | → | → | → | → | → | → | → |
| Polymerization step (I) | | | | | | | | | | |
| Gas phase H$_2$ mol % | 15 | 15 | 15 | 15 | 10 | 20 | 15 | 15 | 15 | 15 |
| MI(i) g/10 min. | 220 | 212 | 222 | 228 | 110 | 300 | 200 | 212 | 230 | 199 |
| Glycol compound (D) | A* | — | A* | A* | A* | A* | A* | A* | A* | A* |
| D/Ti in solid catalyst (mol/atom) | 10.0 | — | 5.0 | 60.0 | 10 | 10 | 150 | 0.5 | 10 | 10 |
| Polymerization step (II) | | | | | | | | | | |
| Gas phase H$_2$ mol % | 2.0 | 2.0 | 2.0 | 2.0 | 2.0 | 1.0 | — | 2.0 | 0.5 | 15 |
| MI(ii) g/10 min. | 0.002 | 0.001 | 0.002 | 0.003 | 0.02 | 0.0002 | — | 0.001 | 0.00002 | 3.00 |
| Ratio of polymerized amounts Polymerization step (I):(II) | 78:22 | 81:19 | 79:21 | 78:22 | 78:22 | 77:23 | — | 81:19 | 80:20 | 78:22 |
| Product powder | | | | | | | | | | |
| MI g/10 min. | 17.1 | 20.6 | 19.4 | 19.2 | 16.5 | 11.4 | — | 20.6 | 7.96 | 79.0 |
| Ethylene content wt. % | 10.4 | 11.4 | 10.2 | 12.0 | 10.8 | 12.0 | — | 11.4 | 13.2 | 10.0 |
| Lof(MI(i)/MI(ii)) | 5.0 | 5.3 | 5.0 | 4.9 | 3.7 | 6.2 | — | 5.3 | 7.1 | 1.8 |
| Soluble polymer % | 3.5 | 3.6 | 3.2 | 3.3 | 4.5 | 2.6 | — | 3.6 | 3.0 | 8.5 |
| Activity of polymerization step (II) % | 90 | 100 | 95 | 82 | 88 | 95 | 10 | 99 | 80 | 80 |
| MI (pellet) g/10 min. | 16.4 | 19.4 | 18.6 | 18.6 | 15.9 | 11.2 | — | 19.5 | 7.02 | 19.5 |
| FE number/1,000 cm² | 3 | 1010 | 11 | 1 | 0 | 22 | — | 900 | 805 | 2 |
| II* (−20° C.) kgcm/cm | 9.0 | 8.4 | 9.4 | 9.1 | 8.6 | 9.1 | — | 8.0 | 8.0 | 7.8 |
| Flexural modulus 10⁴ kg/cm² | 1.250 | 1.155 | 1.200 | 1.2101 | 1.190 | 1.220 | — | 1.100 | 1.120 | 1.170 |

A*: tetraethylene glycol dimethyl ether
II*: Izod impact

TABLE 1-2

| | Comp.ex. 4 | Comp.ex. 5 |
|---|---|---|
| Solid catalyst component (A) | Carrier type* | Reduction type* |
| Polymerization step (I) | | |
| Gas phase $H_2$ mol % | 15 | 3.5 |
| MI(i) g/10 min. | 210 | 12.2 |
| Glycol compound (D) | A* | A* |
| D/Ti in solid catalyst (mol/atom) | 10 | 0.6 |
| Polymerization step (II) | | |
| Gas phase $H_2$ mol % | 2.0 | 2.0 |
| MI(ii) g/10 min. | 0.002 | 0.001 |
| Ratio of polymerized amounts Polymerization step (I):(II) | 88:12 | 87:13 |
| Product powder | | |
| MI g/10 min. | 52.4 | 3.6 |
| Ethylene content wt. % | 7.9 | 8.4 |
| Log(MI(i)/MI(ii)) | 5.0 | 3.3 |
| Soluble polymer % | 7.5 | 3.0 |
| Activity of polymerization step (II) % | 55 | 50 |
| MI (pellet) g/10 min. | 18.8 | 3.5 |
| FE number/1,000 $cm^2$ | 35 | 18 |
| II (−20° C.) kgcm/cm | 4.5 | 6.3 |
| Flexural modulus $10^4$ $kg/cm^2$ | 1.150 | 1.200 |

Carrier type: Catalyst using ethyl benzoate as electron donor
Reduction type: Catalyst used in Example of Japanese patent application laid-open No. Sho 62-116618

TABLE 1-3

| | Comp.ex. 6 | Example 8 | Example 9 | Example 10 | Example 11 | Example 12 | Example 13 |
|---|---|---|---|---|---|---|---|
| Solid catalyst component (A) | Present invention | → | → | → | → | → | → |
| Polymerization step (I) | | | | | | | |
| Gas phase $H_2$ mol % | 15 | 15 | 15 | 15 | 15 | 15 | 15 |
| MI(i) g/10 min. | 220 | 222 | 212 | 229 | 217 | 227 | 213 |
| Glycol compound (D) | B* | C* | D* | E* | E* | F* | F* |
| D/Ti in solid catalyst (mol/atom) | 40 | 10 | 10 | 60 | 100 | 40 | 60 |
| Polymerization step (II) | | | | | | | |
| Gas phase $H_2$ mol % | 2.0 | 2.0 | 2.0 | 2.0 | 2.0 | 2.0 | 2.0 |
| MI(ii) g/10 min. | 0.002 | 0.002 | 0.001 | 0.003 | 0.001 | 0.001 | 0.002 |
| Ratio of polyemrized amounts Polymerization step (I):(II) | 80:20 | 79:21 | 81:19 | 77:23 | 83:17 | 82:18 | 81:19 |
| Product powder | | | | | | | |
| MI g/10 min. | 21.6 | 19.4 | 20.6 | 19.3 | 26.8 | 24.7 | 23.6 |
| Ethylene content wt. % | 10.0 | 10.2 | 11.4 | 11.0 | 10.4 | 11.4 | 10.3 |
| Log(MI(i)/MI(ii)) | 5.0 | 5.0 | 5.3 | 5.9 | 5.3 | 5.4 | 5.0 |
| Soluble polymer % | 3.1 | 3.1 | 3.6 | 3.1 | 3.3 | 3.1 | 3.2 |
| Activity of polymerization step (II) % | 20 | 85 | 90 | 80 | 85 | 83 | 85 |
| MI (pellet) g/10 min. | 18.6 | 18.6 | 19.4 | 18.9 | 25.5 | 22.5 | 22.5 |
| FE number/1,000 $cm^2$ | 410 | 15 | 20 | 0 | 5 | 8 | 1 |
| II (−20° C.) kgcm/cm | 7.5 | 8.0 | 8.4 | 9.2 | 8.6 | 9.0 | 9.0 |
| Flexural modulus $10^4$ $kg/cm^2$ | 1.110 | 1.130 | 1.180 | 1.215 | 1.205 | 1.180 | 1.210 |

B*: diethylene glycol dimethyl ether
C*: triethylene glycol dimethyl ether
D*: triethylene glycol methyl ether
E*: tripropylene glycol diacrylate
F*: triethylene glycol dimethacrylate

TABLE 1-4

| | Results of polymerization conditions | | | | |
|---|---|---|---|---|---|
| | Comp.ex. 7 | Comp.Ex. 8 | Comp.ex. 9 | Comp.ex. 10 | Comp.ex. 11 |
| Solid catalyst component (A) | Present invention | → | → | → | → |
| Polymerization step (I) | | | | | |
| Gas phase $H_2$ mol % | 15 | 15 | 15 | 15 | 15 |
| MI(i) g/10 min. | 218 | 222 | 212 | 217 | 229 |
| Glycol compound (D) | G* | G* | H* | I* | J* |
| D/Ti in solid catalyst (mol/atom) | 10 | 40 | 10 | 10 | 10 |
| Polymerization step (II) | | | | | |
| Gas phase $H_2$ mol % | 2.0 | 2.0 | 2.0 | 2.0 | 2.0 |
| MI(ii) g/10 min. | 0.002 | 0.001 | 0.002 | 0.003 | 0.003 |
| Ratio of polymerized amounts Polymerization step (I):(II) | 80:20 | 78:22 | 81:19 | 83:17 | 77:23 |
| Product powder | | | | | |
| MI g/10 min. | 20.8 | 19.7 | 21.4 | 20.6 | 19.1 |
| Ethylene content wt. % | 10.5 | 11.0 | 10.8 | 10.3 | 9.8 |
| Log(MI(i)/MI(ii)) | 5.0 | 5.3 | 5.0 | 4.8 | 4.9 |
| Soluble polymer % | 7.5 | 8.8 | 7.7 | 8.9 | 10.3 |
| Activity of polymerization step (II) % | 42 | 18 | 25 | 23 | 20 |
| MI (pellet) g/10 min. | 19.6 | 18.8 | 19.9 | 20.0 | 18.5 |
| FE number/1,000 $cm^2$ | >1000 | 550 | >1000 | >1000 | >1000 |
| II (−20° C.) kgcm/cm | 5.6 | 6.8 | 6.4 | 6.1 | 5.5 |
| Flexural modulus $10^4$ $kg/cm^2$ | 1.050 | 1.080 | 1.100 | 1.120 | 1.090 |

G*: acetophenone
H*: methyl p-toluate
I*: triethylamine
J*: ethylaluminum dichloride

TABLE 1-5

| | Results of polymerization conditions | | | |
|---|---|---|---|---|
| | Example 14 | Comp. ex. 12 | Example 15 | Comp. ex. 13 |
| Solid catalyst component (A) | Present invention | → | → | → |
| Polymerization step (I) | | | | |
| Gas phase $H_2$ mol % | 15 | 15 | 15 | 15 |
| MI(i) g/10 min. | 225 | 224 | 210 | 220 |
| Glycol compound (D) | A* | B* | A* | B* |
| D/Ti in solid catalyst (mol/atom) | 10 | 10 | 10 | 10 |
| Polymerization step (II) | | | | |
| Gas phase $H_2$ mol % | 2.0 | 2.0 | 2.0 | 2.0 |
| MI(ii) g/10 min. | 0.002 | 0.002 | 0.002 | 0.002 |
| Ratio of polymerized amounts Polymerization step (I):(II) | 79:21 | 83:17 | 81:19 | 82:18 |
| Product powder | | | | |
| MI g/10 min. | 19.6 | 31.0 | 23.3 | 19.1 |
| Ethylene content wt. % | 10.3 | 9.5 | 10.1 | 9.8 |
| Log(MI(i)/MI(ii)) | 5.1 | 5.1 | 5.0 | 4.9 |
| Soluble polymer % | 3.3 | 4.1 | 7.7 | 10.3 |
| Activity of polymerization step (II) % | 92 | 50 | 85 | 44 |
| MI (pellet) g/10 min. | 18.8 | 28.8 | 22.9 | 27.2 |
| FE number/1,000 $cm^2$ | 2 | 450 | 15 | 660 |
| II (−20° C.) kgcm/cm | 9.2 | 8.8 | 9.9 | 9.5 |
| Flexural modulus $10^4$ $kg/cm^2$ | 1.230 | 1.1501 | 1.100 | 1.050 |

What we claim is:

1. In a continuous production process of a propylene-ethylene block copolymer by way of multistage polymerization steps, using a catalyst system having combined a solid catalyst component (A) containing titanium, magnesium, halogen and a polyvalent carboxylic acid ester as indispensable components, an organoaluminum compound (B) and an electron-donating compound (C), and employing three or more connected polymerization vessels, the improvement which comprises a first stage wherein two or more polymerization vessels connected in series are employed and a polymerization step (I) directed mainly to propylene polymerization is continuously carried out while feeding propylene with up to 5% by weight ethylene, to prepare a polymer of 60 to 95% by weight of the total polymer weight, and a second stage wherein a glycol compound (D) expressed by the formula (1)

$$R^1\text{---}(O\text{---}CH_2\text{---}C(R^7)H\text{---})_n\text{---}OR^2 \qquad (1)$$

(wherein n represents $3 \leq n \leq 100$, $R^1$ and $R^2$ each represent hydrogen atom, or a monovalent organic group of 1 to 20 carbon atoms or a monovalent organic group of 1 to 20 carbon atoms containing a hetero atom of oxygen, nitrogen, phosphorus, sulfur or silicon atom, $R^1$ and $R^2$ may be same or different and $R^7$ represents hydrogen atom or a monovalent organic group of 1 to 5 carbon atoms), is continuously added to a polymerization reaction mixture obtained at the first stage, so as to give a D mol/Ti atom in (A) of 1 to 100, followed by successively feeding to the addition polymerization reaction mixture, monomers of ethylene+propylene wherein ethylene is present in an amount of at least 10% by weight, employing one or more polymerization vessels, to continuously carry out a polymerization step (II) wherein a relatively large quantity of ethylene is contained and a copolymer of 5 to 40% by weight of the total polymer weight is produced.

2. A process according to claim 1, wherein the melt index (abbreviated to MI (i)) of the polymer obtained at the polymerization step (I) wherein propylene is mainly contained, and the melt index (abbreviated to MI (ii)) of the copolymer obtained at the polymerization step (II) wherein ethylene is contained in a relatively large quantity, have the following relationship:

$$2 \leq LOG(MI(i)/MI(ii)) \leq 7$$

wherein the melt indexes refer to a value measured at 230° C. and under a load of 2.16 Kg according to ASTM D-1238.

3. A process according to claim 1, wherein the quantity of said glycol compound added is determined so that the catalytic activity after its addition can be 80 to 98% of the catalytic activity before its addition.

* * * * *